(12) United States Patent
Olson et al.

(10) Patent No.: US 6,233,382 B1
(45) Date of Patent: May 15, 2001

(54) PACKAGE FOR AN OPTICAL BRAGG GRATING FIBER FOR REDUCING THE TEMPERATURE DEPENDENCE OF ITS REFLECTION WAVELENGTH

(75) Inventors: Grieg A. Olson; William W. Morey, both of Austin, TX (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 09/492,614

(22) Filed: Jan. 27, 2000

(51) Int. Cl.$^7$ .................................................. G02B 6/34
(52) U.S. Cl. .............................................. 385/37; 385/137
(58) Field of Search .............................. 385/37, 134, 136, 385/137

(56) References Cited

U.S. PATENT DOCUMENTS

| | | | |
|---|---|---|---|
| 5,042,898 | 8/1991 | Morey et al. | 385/37 |
| 5,694,503 | * 12/1997 | Fleming et al. | 385/37 |
| 5,715,265 | 2/1998 | Epworth | 372/38 |
| 5,757,540 | * 5/1998 | Judkins et al. | 359/341 |
| 6,044,189 | * 3/2000 | Miller | 385/37 |

FOREIGN PATENT DOCUMENTS

| | | |
|---|---|---|
| 0 766 359 B1 | 7/1999 | (EP) . |
| WO 98/59267 | 12/1998 | (WO) . |

\* cited by examiner

*Primary Examiner*—Hemang Sanghavi
*Assistant Examiner*—Jennifer Doan
(74) *Attorney, Agent, or Firm*—John E. Fortkort

(57) ABSTRACT

A thermal compensation package for an optical fiber having a Bragg grating is provided. The package includes a support member adapted to support the optical fiber which is in contact with the optical fiber along substantially the entire length of the Bragg grating. At least one retaining member is provided for attaching the optical fiber to the support member. The support member is formed from a material having a first CTE that is negative in a first direction and a second CTE in a second direction that is different from the first CTE. The material is selected so that the first CTE has a sufficiently negative value to compensate for temperature fluctuations such that a reflection wavelength of the Bragg grating is substantially temperature independent over a given operating range.

34 Claims, 1 Drawing Sheet

PACKAGE FOR AN OPTICAL BRAGG GRATING FIBER FOR REDUCING THE TEMPERATURE DEPENDENCE OF ITS REFLECTION WAVELENGTH

FIELD OF THE INVENTION

The present invention relates generally to a package for an optical Bragg grating fiber, and more particularly, to a package for an optical Bragg grating fiber that ensures that the reflection wavelength of the grating is substantially temperature independent.

BACKGROUND OF THE INVENTION

A conventional Bragg grating comprises an optical fiber in which the index of refraction undergoes periodic perturbations along its length. The perturbations may be equally spaced in the case of an unchirped grating, or may be unequally spaced in the case of a chirped grating. The grating reflects light over a given waveband centered around a wavelength equal to twice the spacing between successive perturbations. The remaining wavelengths pass essentially unimpeded. Such Bragg gratings are typically employed in a variety of applications including filtering, stabilization of semiconductor lasers, reflection of fiber amplifier pump energy, and compensation for fiber dispersion.

Fiber Bragg gratings are also important components in optical communication systems that employ wavelength-division multiplexing. In such systems, it is important that the carrier wavelength of each channel is maintained at a precise value, which is typically about +/−0.1 nm. Unfortunately, both the refractive index of the grating and the distance between successive perturbations are temperature dependent. As a result, the reflected waveband is also temperature dependent. In many cases, however, it is desirable to provide a stabilized reflection band that is temperature independent. U.S. Pat. No. 5,042,898 (Morey et al.) discloses a temperature-independent Bragg grating in which wavelength changes resulting from changes in strain are used to compensate for wavelength changes resulting from variations in the temperature of the grating. In particular, a constant wavelength of reflected light may be maintained during a drop in temperature by increasing the longitudinal strain on the fiber. This reference uses a complex mechanical arrangement of materials with differing, but positive, coefficients of thermal expansion (CTE). Specifically, in this reference a portion of the optical fiber containing the grating is sectioned off by securing the optical fiber at each side of the grating to separate metallic compensating members arranged for longitudinal movement relative to one another. The CTEs of the two compensating members are both positive and different from one another. By mechanically adjusting the compensating members longitudinally relative to each other to thereby vary the distance between them, there is imposed on the optical grating a longitudinal strain of a magnitude that varies to balance out wavelength variations resulting from changes in the temperature of the grating. This known temperature compensating package, however, is complex and expensive to manufacture.

The same result achieved by the compensating package disclosed in the previously mentioned patent can be achieved with a less complex arrangement by fabricating the package from a material that has a negative coefficient of thermal expansion (CTE). When such a material is employed, the reflected wavelength of the fiber grating will be substantially independent of temperature if the package has a CTE equal to the percent change in wavelength per degree Celsius of the uncompensated fiber grating. For typical applications, the package must be formed from a material having a CTE in range of $-14.5 \times 10^{-6}$ to $-8 \times 10^{-6}/°$C.

Materials having a negative CTE are generally either difficult to produce or relatively expensive. Moreover, it is particularly difficult to provide a negative CTE material that precisely compensates for temperature variations without any overcompensation or undercompensation. Accordingly, it would be desirable to provide a thermal compensating package for a fiber Bragg grating that has an appropriate CTE so that the reflection wavelength of the grating is substantially temperature independent. This, and other needs, are met by the present invention, as hereinafter described.

SUMMARY OF THE INVENTION

In one aspect, the present invention relates to a thermal compensation package for an optical fiber having a Bragg grating. The package includes a support member which is adapted to support the optical fiber. The support member may contact the optical fiber along substantially the entire length of the Bragg grating, or it may contact the optical fiber in the areas adjacent to the ends of the Bragg grating. At least one retaining member is provided for attaching the optical fiber to the support member. The support member is formed from a material having a first CTE that is negative in one direction and a second CTE in another direction that is different from the first CTE. The material is selected so that the first CTE has a sufficiently negative value to compensate for temperature fluctuations such that a reflection wavelength of the Bragg grating is substantially temperature independent over a given operating range.

In one particular embodiment of the invention, the first CTE is about equal to $$-(\alpha_f p_e + \zeta)/(1-p_e)$$

where $\alpha_f$ is the thermal expansion coefficient of the optical fiber, $p_e$ is the photoelastic constant of the optical fiber, and $\zeta$ is the thermooptic coefficient of the optical fiber.

In another aspect, the present invention relates to a thermal compensation package for an optical fiber having a Bragg grating of the type described above in which the support member is formed from a composite material. The composite material may include a plurality of fibers embedded in an epoxy resin or another suitable matrix. In one particular embodiment, the plurality of fibers includes a majority of fibers of a first type and a minority of fibers of a second type. For example, the first type of fiber may be a polymer fiber and the second fiber may be a carbon fiber.

DETAILED DESCRIPTION

Figure 1:
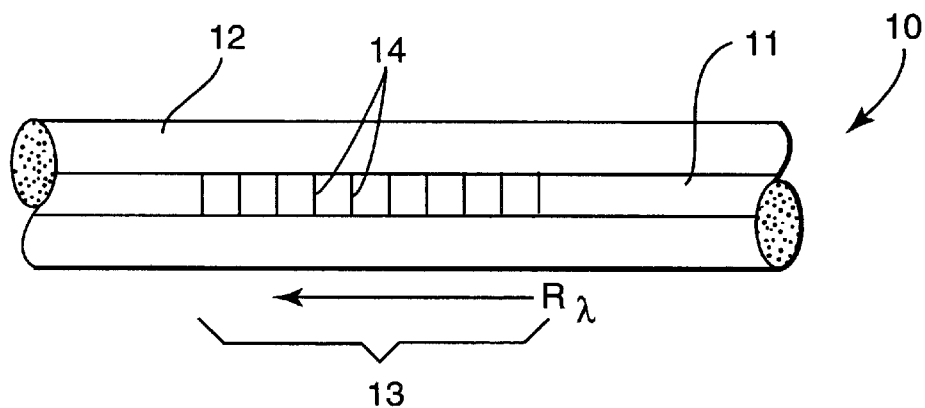
FIG. 1 is a schematic representation which shows the interior of a Bragg grating fiber constructed in accordance with the present invention.

Referring now to the drawing in detail, and first to FIG. 1 thereof, it may be seen that the reference numeral 10 has been used therein to identify an optical waveguide. The waveguide is shown to be configured as an optical fiber of which only a relatively short longitudinal portion is depicted and which includes a fiber core 11 and a fiber cladding 12 surrounding the fiber core. The fiber core incorporates a grating region 13 that includes a multitude of grating elements 14, each of which extend substantially normal to the longitudinal axis of the core. If the grating is unchirped, the grating elements are equidistantly spaced from one another as considered in the longitudinal direction of the optical fiber. Alternatively, if the grating is to be chirped, the spacing between grating elements will vary in a predetermined manner.

Figure 2:
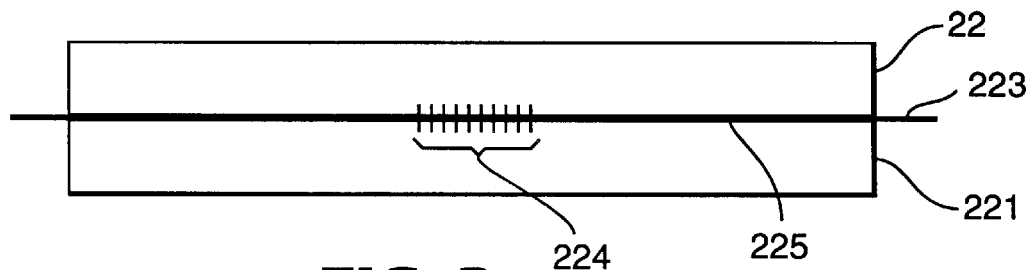
FIG. 2 shows a perspective view of the exterior of the package shown in FIG. 1.
Figure 3:
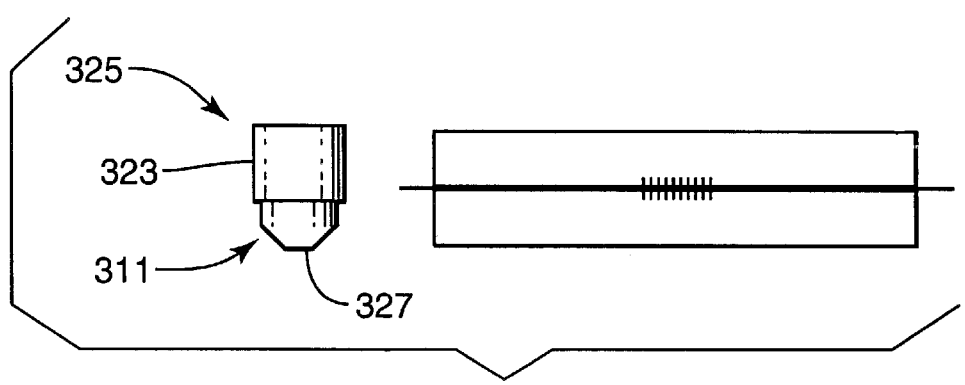
FIG. 3 shows an example of a mechanical fastener that may be employed in the present invention to mount the optical fiber to a substrate.

FIG. 2 schematically depicts an exemplary embodiment of the invention in which an optical fiber 223 that includes a Bragg grating region 224 is mounted to a substrate 221 formed from a material having a negative coefficient of thermal expansion. The fiber may be mechanically fastened to the substrate by a fastener such as the fastener shown in cross-section in FIG. 3. As shown in FIG. 3, the optical fiber 323 is positioned in a groove 327 located in a substrate 311. The groove is effectively isolated by fastener 325. Alternatively, instead of a mechanical fastener, the fiber may be adhesively bonded to the substrate with a suitable adhesive (indicated in FIG. 2 by reference numeral 225) such as an epoxy based adhesive. Preferably, the adhesives used in the present invention are those that have a low thermal expansion, a glass transition temperature greater than 90° C., and a cure temperature less than 85° C.

In the embodiment shown, the fiber is in continuous contact with the substrate along at least the portion of the fiber that includes the Bragg grating region. In other embodiments, the support member may contact the optical fiber only in the areas adjacent to the ends of the Bragg grating. In still other embodiments, the support member may contact the optical fiber in the areas adjacent to the ends of the Bragg grating, and at one or more points along the length of the Bragg grating. Regardless of the mounting technique employed, however, the optical fiber is mounted on the support member in such a way that the tensile or compressive forces will be evenly distributed along the grating.

In accordance with the present invention, the substrate is formed from a material that has an anisotropic CTE. One example of such a material is a composite material in which polymer fibers are embedded in an epoxy matrix. Such a composite material can be selected to have a large, negative CTE along the axes of the fibers. The CTE in the direction transverse to the fiber axes is much larger, i.e., more positive, however. One example of such a composite material is available from Bryte Technologies, Morgan Hill, Calif. under the name Spectra®. This material has a CTE of −10 ppm/° C. in the axial direction and a CTE of 105 ppm/° C. in the transverse direction. This material is provided as polyethylene fibers embedded in an epoxy resin. To form the composite, the fibers must be oriented, pressed in combination with the resin, and then cured.

The CTE of the previously mentioned composite material along the axes of the fibers is in general too negative for many applications in which a grating package having a temperature independent reflection wavelength is to be provided. That is, the strain of the composite material will overcompensate the grating for the temperature dependence of its reflected wavelength. For example, whereas a CTE of about −8/° C. is desirable for many grating applications, the previously mentioned composite material has a CTE of about −10/° C. along the fiber axes. This overcompensation problem can be overcome in a number of different ways.

One way to increase the CTE of the composite material is to add to it a small amount of another fiber. For example, the addition of carbon fibers to the polyethylene fibers described above yields a composite having a CTE along the fiber axes that is very close to the value needed to compensate for the temperature dependence of the Bragg grating. Instead of carbon fibers, other fibers, such as glass fibers, may be employed for this purpose.

Another way to effectively increase the CTE of the composite material as experienced by the fiber grating is by taking advantage of the material's anisotropic nature. In particular, the fiber Bragg grating need not extend precisely parallel to the axes of the polymer fibers in the composite material. Rather, the Bragg grating could be oriented so that its axis forms an angle with the axes of the polymer fibers that is greater than zero. Since the CTE of the composite material is greater than its CTE along the fiber axes, the CTE experienced by the grating increases as the angle between the polymer fiber axes and the grating axis increases. Accordingly, it is possible to fine tune the effective CTE experienced by the grating by proper adjustment of this angle. If the composite material that is used is Spectra®, for instance, an angle of between 0 and 10° should be sufficient to properly compensate the Bragg grating for temperature variations.

The effective (negative) value for the CTE of the composite material as experienced by the Bragg grating can be calculated from the following expression:

$$CTE = (\alpha_f p_e + \zeta)/(1 - p_e)$$

where $\alpha_f$ is the thermal expansion coefficient of the optical fiber 223, $P_e$ is the photoelastic constant of the optical fiber 223, and $\zeta$ is the thermooptic coefficient of the optical fiber 223. As previously mentioned, for typical fibers this value should be about −8/° C.

The preceding description of the present invention is merely illustrative, and is not intended to be limiting. Therefore, the scope of the present invention should be construed solely by reference to the appended claims.

What is claimed is:

1. A device, comprising:
   an optical fiber equipped with a Bragg grating;
   a support member adapted to support the optical fiber; and
   at least one retaining member adapted to attach the optical fiber to the support member;
   wherein said support member is formed from a material having a first CTE in a first direction that is negative and a second CTE in a second direction that is different from the first CTE, wherein the first CTE has a sufficiently negative value to compensate for temperature fluctuations such that a reflection wavelength of the Bragg grating is substantially temperature independent over a given operating range, and wherein said first CTE is about equal to $$-(\alpha_f p_e + \zeta)/(1 - p_e),$$

where $\alpha^f$ is the thermal expansion coefficient of the optical fiber, $p_e$ is the photoelastic constant of the optical fiber, and $\zeta$ is the thermooptic coefficient of the optical fiber.

2. The device of claim 1, wherein said support member is formed from a composite material.

3. The device of claim 2, wherein said composite material includes a plurality of fibers embedded in a matrix.

4. The device of claim 3, wherein said plurality of fibers comprise a polymeric material.

5. The device of claim 4, wherein said polymeric material is polyethylene.

6. The device of claim 5, wherein said matrix comprises an epoxy resin.

7. The device of claim 3, wherein said plurality of fibers includes a majority of fibers of a first type and a minority of fibers of a second type.

8. The device of claim 7, wherein said first type of fiber is selected from the group consisting of fibers comprising a polymeric material, and wherein said second type of fiber is selected from the group consisting of fibers comprising carbon.

9. The device of claim 8, wherein said polymeric material is polyethylene.

10. The device of claim 3, wherein said retaining member is oriented such that the axis of the fiber grating forms a prescribed angle with respect to said plurality of fibers.

11. The device of claim 10, wherein said prescribed angle is about zero degrees.

12. The device of claim 1, wherein said retaining member is a mechanical fastener.

13. The device of claim 1, wherein said retaining member is an adhesive material bonding the optical fiber to the support member.

14. The device of claim 1, wherein the support member contacts the optical fiber along substantially the entire length of the Bragg grating.

15. The device of claim 1, wherein the Bragg grating has a first and second end, and wherein the support member contacts the optical fiber along the areas adjacent to said first and second ends.

16. The device of claim 1, wherein the first CTE is about $-10/°$ C.

17. The device of claim 1, wherein the first CTE is about $-8/°$ C.

18. The device of claim 1, wherein the grating has a longitudinal axis, and wherein the first direction is parallel to the longitudinal axis of the grating.

19. A device, comprising:
   an optical fiber equipped with a Bragg grating, said grating having a longitudinal axis;
   a support member adapted to support the optical fiber, said support member comprising a composite material which includes a plurality of fibers embedded in a matrix, said plurality of fibers being disposed essentially along a common axis; and
   at least one retaining member attaching the optical fiber to the support member, said retaining member being oriented such that the longitudinal axis of the grating forms a prescribed angle with respect to the common axis of said plurality of fibers;
wherein said support member is formed from a material having a first CTE in a first direction that is negative and a second CTE in a second direction that is different from the first CTE, wherein the first CTE has a sufficiently negative value to compensate for temperature fluctuations such that a reflection wavelength of the Bragg grating is substantially temperature independent over a given operating range, and wherein said prescribed angle is selected so that an effective CTE experienced by the optical fiber is approximately equal to $$-(\alpha_f p_e + \zeta)/(1-p_e),$$

where $\alpha_f$ is the thermal expansion coefficient of the optical fiber, $p_e$ is the photoelastic constant of the optical fiber, and $\zeta$ is the thermooptic coefficient of the optical fiber.

20. The device of claim 19, wherein said plurality of fibers comprise a polymeric material.

21. The device of claim 20, wherein said polymeric material is polyethylene.

22. The device of claim 19, wherein said matrix comprises an epoxy resin.

23. The device of claim 19, wherein said retaining member is a mechanical fastener.

24. The device of claim 19, wherein said retaining member is an adhesive material bonding the optical fiber to the support member.

25. The device of claim 19, wherein said plurality of fibers includes a majority of fibers of a first type and a minority of fibers of a second type.

26. The device of claim 25, wherein said first type of fiber is selected from the group consisting of fibers comprising a polymeric material, and wherein said second type of fiber is selected from the group consisting of fibers comprising carbon.

27. The device of claim 26, wherein said polymeric material is polyethylene.

28. The device of claim 19, wherein said prescribed angle is within the range of about 0 to about 10 degrees.

29. The device of claim 19, wherein said prescribed angle is about zero degrees.

30. The device of claim 19, wherein the support member contacts the optical fiber along substantially the entire length of the Bragg grating.

31. The device of claim 19, wherein the Bragg grating has a first and second end, and wherein the support member contacts the optical fiber along the areas adjacent to said first and second ends.

32. The device of claim 19, wherein the first direction is parallel to the longitudinal axis of the grating.

33. The device of claim 32, wherein the first CTE is about $-10/°$ C.

34. The device of claim 32, wherein the first CTE is about $-8/°$ C.

* * * * *